3,850,988
PURIFICATION OF BENZOPHENONES
William R. Ruby, Woodland Park, N.Y., assignor to GAF Corporation, New York, N.Y.
No Drawing. Filed Sept. 7, 1971, Ser. No. 178,470
Int. Cl. C07c 49/82
U.S. Cl. 260—591
13 Claims

ABSTRACT OF THE DISCLOSURE

Hydroxy substituted benzophenones, such as 2,4-dihydroxybenzophenone, are purified by contacting with an activated bentonite clay in the presence of a non-polar solvent to improve the purity and color thereof.

BACKGROUND OF THE INVENTION

Field of the Invention

This invention relates to purification procedures and more particularly to a novel method for the purification of hydroxy substituted benzophenone compounds by contact with an activated bentonite clay.

DESCRIPTION OF THE PRIOR ART

Arylphenones, such as 2,4-dihydroxybenzophenone, and related substituted benzophenones are widely used as ultra-violet light absorbers especially in resinous and polymeric compositions, such as polystyrene, polyacrylonitrile, polyacrylate and polymethacrylate polymers. They are also useful as intermediates in the preparation of other ultra-violet light absorbers, such as are described in U.S. Pat. Nos. 3,006,959, 3,505,405 and 3,526,666.

A customary method of preparing compounds of this type is by use of a Friedel-Crafts type of reaction wherein a benzoyl chloride is reacted with a hydroxy substituted benzene, such as resorcinol in the presence of a Lewis acid, such as aluminum chloride. Products which are obtained by this process are generally impure but can be purified to some extent to give a product having a very light color and reasonably high degree of purity. However, this method is not economically desirable because the yields are relatively low, i.e. rarely above 75%, and in addition large amounts of the expensive Lewis acids, such as aluminum chloride are required for the reaction.

Another method of producing products of this type is by the method described in Beilstein 8,312, wherein benzotrichloride and resorcinol are reacted at a moderate temperature in a suitable solvent. This process is economically desirable in that the intermediates are inexpensive and the reaction proceeds easily with high yields. However, the process has a troublesome disadvantage in that the product resulting from the reaction is highly colored and very difficult to purify. U.S. Pat. No. 3,526,-666 discusses this process and product and indicates that processes of this type are undesirable because high coloration of the crude product makes it impossible to purify in some instances and at best purification is difficult, time consuming, expensive and the yields are often small.

There is also the so-called Hoesch method for producing 2,4-dihydroxybenzophenones wherein benzonitrile and a compound such as resorcinol are treated with hydrogen chloride gas and zinc chloride in an ether solvent. This process is thoroughly discussed by Spoerri and Du Bois in Organic Reactions, John Wiley and Sons, Inc. (New York, 1949), Volume 5, Chapter 9. U.S. Pat. No. 3,371,119 describes an improvement on this process. This process has an economic advantage over the Friedel-Crafts method but like the previously described method of Beilstein, the product is highly colored and difficult to purify.

In view of the requirement that products of this type be of high purity and light in color, much work has been carried out toward finding a simple and inexpensive procedure for removing the colored impurities from the highly colored products produced by any of these processes of preparation. Various purification procedures have been tried involving zone melting, absorption on various organic substrates, isolation of insoluble salts, destruction of impurities by hydrolysis under both acidic and alkaline conditions, recrystallization from two-component solvent systems, conversion of colored components to non-colored components and the like. However, none of these methods have been found to satisfactorily decolorize the arylphenone products produced by processes of these types.

An accepted method of purifying arylphenones, especially the hydroxylated benzophenones, is by recrystallization of the product from aqueous or organic solvents after treatment with activated charcoal. This method is described in U.S. Pat. Nos. 2,419,553, 2,682,559, 2,854,-485, 2,861,105, 2,921,662 and 3,092,663. This method of purification of the highly colored products obtained by either of the two methods described above namely the Beilstein method and the Hoesch method, is generally carried out by dissolving in an organic solvent, treating with the activated charcoal, clarifying and crystallizing in order to remove the impurities. However, this purification method generally fails to remove the impurities to the extent that the resulting products are still unsatisfactorily colored. Unless the product is quite light it cannot be used for many purposes since the color will cause undesirable coloration in final products, such as plastics, which it is intended to protect against ultra-violet radiation.

A further purification process is mentioned in U.S. Pat. No. 3,526,666 particularly in Example 2 wherein a product of this type is purified by contact with an activated clay in the presence of a polar solvent, in this case methanolacetone system. However, in applicant's study of this process it has been determined that even when an activated clay is employed with a polar solvent the combination purification procedure is ineffective to remove the highly colored impurities from the arylphenones particularly when prepared by the Beilstein or benzotrichloride route.

The present invention provides a method for purification of arylphenones which overcomes or otherwise mitigates the disadvantages of the prior art.

SUMMARY OF THE INVENTION

It is accordingly one object of this invention to provide a method for purification of arylphenones when produced by any method and which contain impurities and colorants which are difficult to remove by conventional procedures.

A still further object of the invention is to provide a method for the purification of arylphenones which comprises contacting the arylphenones with an activated clay in the presence of a non-polar solvent.

Further objects and advantages of the present invention will become apparent as the description thereof proceeds.

In satisfaction of the foregoing objects and advantages, there is provided by this invention a procedure for the purification of arylphenones, and especially unsubstituted or substituted 2,4 - dihydroxybenzophenones, which comprises contacting the impure arylphenones with an activated clay in the presence of a non-polar solvent, removing the clay and recovering the purified product from the resultant solution.

DESCRIPTION OF PREFERRED EMBODIMENTS

According to this invention it has been found that if activated charcoal is replaced by activated earths in the purification of arylphenones, that decolorization and thus purification is simple, inexpensive and effective. The activated earths considered most effective for use in the process of the present invention are the bentonite clays, the decolorizing power of which have been enhanced by an acid treatment. The general method of activating bentonite clays is well known and involves mixing the clay with water to form a suspension to which is then added a mineral acid such as hydrochloric acid or sulfuric acid or mixtures thereof. The mixture is then heated for several hours at a temperature of about 50° to 100° C., diluted with water, filtered and washed free of acid. The cakes of activated earth are then dried to a convenient moisture content and pulverized in preparation for use in the process of the invention.

The arylphenones to which the purification procedure of the present invention is directed may be defined by the following general formula:

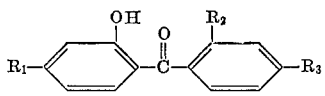

wherein, in the above formula, $R_2$ is H or OH, $R_1$ and $R_3$ are H, OH or OR, wherein R is $C_1$ to $C_{12}$ alkyl group. The preferred compounds to which the invention is applicable are the following:

2,4-dihydroxybenzophenone
2,2'-dihydroxybenzophenone
2,2',4-trihydroxybenzophenone
2,2',4,4'-tetrahydroxybenzophenone
2,2'-dihydroxy-4-methoxybenzophenone
2,2'-dihydroxy-4,4'-dimethoxybenzophenone
2,2'-dihydroxy-4,4'-diethoxybenzophenone
2,2'-dihydroxy-4-ethoxybenzophenone
2,2'-dihydroxy-4-butoxybenzophenone
2-hydroxy-4-ethoxybenzophenone
2-hydroxy-4-octyloxybenzophenone
2-hydroxy-4-decyloxybenzophenone
2-hydroxy-4-dodecyloxybenzophenone These compounds are well known in the art and are preferably prepared by the above-described Beilstein method, that is, through the reaction of a benzotrichloride and a second compound such as resorcinol under moderate temperature conditions and in a suitable solvent. Preferred solvents are 20:80 to 80:20 by weight of alcoholic mixtures in water wherein the alcohol is a lower alkyl alcohol of 1 to 3 carbon atoms. This reaction is preferably carried out by contacting the reactants at a temperature of about 25–50° C. by adding the benzotrichloride slowly to the other reactant. A maximum of 50° C. is satisfactory for this process.

After the addition of the reactants is complete, further agitation at moderate temperatures is generally necessary to complete the reaction and the product may be recovered by cooling, separating the solid as by filtration, washing and drying.

While the procedure of the invention is especially suitable for purification of the product resulting from this method of preparation, the invention is equally applicable to the purification of these products prepared by any method including the Hoesch method described above.

A particularly important feature of the purification method of the present invention is that contact of the highly colored product and the activated clay is conducted in the presence of a non-polar solvent. By non-polar solvent is meant that the solvent is a compound of the type whose molecules possess no permanent electric moments and primarily are those solvents which do not ionize (or ionize very weakly) in solution.

Preferred solvents of this type which may be mentioned are aromatic hydrocarbons, halogenated aromatic hydrocarbons, nitro substituted hydrocarbons, aliphatic hydrocarbons and halogenated aliphatic hydrocarbons, as well as mixtures thereof. Particularly preferred non-polar solvents are benzene, toluene, ortho-, meta-, and para-xylene, chlorobenzene, ortho-, meta-, and para-dichlorobenzene, nitrobenzene, ortho-, meta-, and para-dinitrobenzene, n-heptane, n-hexane, n-pentane, 1,2-dichloroethane, trichlorethane and mixtures thereof, The activated clays which are especially suitable for use in the invention are those complex clays of the three-layer crystallite type of the general class of Montmorillonite group and particularly the bentonite clays, a specific subclass of this group, as advantageous results have been achieved using clays of this type. However, other activated clays which yield comparable results may be used.

In carrying out the purification procedure, about one part of the highly colored arylphenone starting material is dissolved in about 1–10 parts of the non-polar solvent. To this solution is then added about 0.04 to 0.5 parts of the activated clay. The mixture is then heated to the reflux. Decoloration occurs almost instantaneously but to obtain a slightly lighter color it is refluxed for about 30 minutes to 5 hours, the reflux temperature being dependent on the solvent, filtered, cooled and the crystals filtered off, washed and dried to provide the highly pure product. The parts referred to in this purification procedure are by weight.

It has been found that this process may be further modified so as to be effective in providing additional color reductions. Thus, it has been found in one instance that a short distillation at atmospheric or slightly subatmospheric pressure of the solution of arylphenone and non-polar solvent prior to addition of the activated earth affords a cleaner product. This is believed to be due to the exclusion of or removal of water from the solution prior to treatment with the activated clay. Accordingly, this distillation step represents a separate preferred embodiment of the invention.

A further procedure which provides even more highly purified products is the addition of a small amount of an organic acid in amounts of about 0.001 to 0.01 parts by weight as it has been found that this improves the color of the final product. The acids employed are those which exert a reducing or a complexing action on iron such as formic acid, oxalic acid, citric acid, maleic acid, fumaric acid, malic acid, tartaric acid, tartronic acid, amino (triacetic acid), ethylene diamino (tetraacetic acid), mixtures thereof, and the like. It is believed that this effect is caused by the formation of soluble, colorless iron salts by the addition of the organic acids.

It has also been found that the addition of a small amount of an activated charcoal of the usual type in the amount of about 0.02 to 0.25 parts by weight provides an additional lightening of color of the final product. This is believed due to the removal of some impurities which are not affected by the activated clay.

The following examples are presented to illustrate the purification method of the present invention. In these examples and throughout the specification parts are by weight unless otherwise indicated.

Example I

A. Thirty-five grams of resorcinol (0.32 mole), 61 cc. of water and 30 cc. of methanol were combined on a water bath at 35° C. Then 68.9 grams of benzotrichloride (0.35 mole) were added slowly, the reaction mix being seeded after each 5 gram addition of benzotrichloride until crystallization began. The charge was allowed to reach a maximum of 50° C. It was then stirred on the 35° C. water bath for 5 hours, cooled in ice, filtered, washed with cold chlorobenzene and then cold water. The yield was excellent, but the product was a highly colored orange.

B. To 37.5 grams of this highly colored product was added 110 cc. of chlorobenzene and 0.1 gram of oxalic acid. This was heated and distilled to eliminate water (20 cc. were distilled off). Then 2.0 grams of Tonsil IFF, an acid activated earth (product of L. A. Salomon Bros.), was added and the charge refluxed for 1 hour. Then 1.0 gram of Nuchar (activated charcoal) was added. It was stirred for 10 minutes, filtered, cooled to 5° C., filtered and washed with cold water. The product consisted of very pale, almost colorless crystals.

C. This experiment was repeated but substituting 2.0 grams of Nuchar for the Tonsil IFF, both with and without oxalic acid. In both cases a strong orange yellow color resulted which was not satisfactory as an ultra-violet light absorbent.

D. This experiment was repeated wherein the Nuchar was omitted. The product was considerably lightened but still had color, probably due to impurities against which the Tonsil IFF was ineffective.

E. This process was repeated employing both the Tonsil IFF and Nuchar, but without oxalic acid. The color was considerably lightened in contrast to the original compound. Subsequent treatment with oxalic acid converted the product to very pale, almost colorless crystals.

Thus, from the above experiments, it appears that activated clay reduces the coloration considerably more than Nuchar alone, that treatment with activated clay plus Nuchar results in a still lighter color, and then activated clay and Nuchar are both employed in the presence of oxalic acid, a very pale, completely satisfactory product is obtained.

Example II

The purification part of Example I was repeated, with the exception that Clarolite T–50 (a product of Georgia Kaolin Distributors) was employed. Results were commensurate with those obtained in Example I.

Example III

Example I was repeated with the exception that the chlorobenzene was replaced by: (a) toluene, (b) dichlorobenzene, (c) xylene, (d) dichloroethane, (e) trichloroethane, (f) N-methylpyrrolidone, (g) dimethylformamide and (h) a mixture of acetone and methanol (as in U.S. Pat. No. 3,526,666).

Light colored products were obtained in high yields in examples (a) thru (e). In the cases of (g) thru (h), lower yields of highly colored products were obtained.

Example IV

Example I was repeated with the exception that the oxalic acid was substituted by citric acid. The final product consisted of pale colored crystals.

The invention has been described herein with reference to certain preferred embodiments. However, as obvious variations will appear to those skilled in the art the invention is not to be considered as limited to such embodiments.

What is claimed is:

1. In a method for the purification of a crude, highly colored arylphenone of the following formula

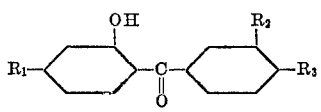

wherein $R_2$ is H or OH, $R_1$ and $R_3$ are H, OH or OR wherein R is a $C_1$ to $C_{12}$ alkyl group, which arylphenone is prepared by reacting a benzothiahalide or a benzonitrile with a hydroxy substituted benzene at a temperature of between 35° C. and 50° C., said method comprising contacting said crude arylphenone with an activated clay, the improvement which comprises dissolving said crude arylphenone in a non-polar solvent selected from the group consisting of benzene, toluene, chlorobenzene, ortho-, meta-, or para-dichlorobenzene, xylene, nitrobenzene, ortho-, meta, or para-dinitrobenzene, n-pentane, n-hexane, n-heptane, 1,2-dichloroethane, trichloroethane and mixtures thereof, and then treating the resulting solution with said activated clay.

2. A method according to claim 7 wherein the arylphenone to be purified is 2,4-dihydroxybenzophenone.

3. A method according to claim 1 wherein said resulting solution is heated with the activated clay at a temperature of from about 75° C. to the reflux temperature of the solvent for a period of from about 30 minutes to about 5 hours and the resulting decolorized crystals are recovered.

4. A method according to claim 1 wherein said resulting solution is contacted with between about 0.04 and about 0.5 parts by weight of said activated clay.

5. A method according to claim 1 wherein the solution of arylphenone and non-polar solvent is distilled to remove water prior to addition of the activated earth.

6. The process of claim 1 wherein said resulting solution is contacted with bentonite to provide substantially pale yellow to colorless crystals.

7. A method according to claim 6 wherein the arylphenone is selected from the group consisting of:

2,4-dihydroxybenzophenone
2,2'-dihydroxybenzophenone
2,2',4-trihydroxybenzophenone
2,2',4,4'-tetrahydroxybenzophenone
2,2'-dihydroxy-4-methoxybenzophenone
2,2'-dihydroxy-4,4'-dimethoxybenzophenone
2,2'-dihydroxy-4,4'-diethoxybenzophenone
2,2'-dihydroxy-4-ethoxybenzophenone
2,2'-dihydroxy-4-butoxybenzophenone
2-hydroxy-4-ethoxybenzophenone
2-hydroxy-4-octyloxybenzophenone
2-hydroxy-4-decyloxybenzophenone, and
2-hydroxy-4-dodecyloxybenzophenone 8. A method according to claim 7 wherein the arylphenone to be purified is 2,4-dihydroxybenzophenone.

9. The process of claim 1 employing between about 1 and about 10 parts by weight of said non-polar solvent per part by weight of crude arylphenone.

10. The process of claim 3 wherein the arylphenone solution is contacted with at least one purification agent of the group comprising an organic acid and activated charcoal.

11. A method according to claim 10 wherein about .001 to .01 parts of an organic acid which exerts a reducing or complexing action on iron is added to the mixture.

12. A method according to claim 11 wherein the organic acid is formic acid, oxalic acid, citric acid, maleic acid, fumaric acid, malic acid, tartaric acid, tartronic acid, amino (triacetic acid), ethylene diamine (tetraacetic acid) or mixtures thereof.

13. A method according to claim 11 wherein about 0.02 to 0.25 parts by weight of an activated charcoal are added to the purification mixture.

References Cited
UNITED STATES PATENTS

| | | | |
|---|---|---|---|
| 3,526,666 | 9/1970 | Ponder | 260—591 |
| 2,682,559 | 6/1954 | Stanley et al. | 260—591 |
| 3,403,183 | 9/1968 | Dobratz et al. | 260—591 |

OTHER REFERENCES

Mantell, Adsorbtion (2nd Edition), pp. 51, 58, 68 and 69 (1951).

DANIEL D. HORWITZ, Primary Examiner

UNITED STATES PATENT OFFICE
CERTIFICATE OF CORRECTION

PATENT NO. : 3,850,988
DATED : November 26, 1974
INVENTOR(S) : William R. Ruby

It is certified that error appears in the above-identified patent and that said Letters Patent are hereby corrected as shown below:

In Claim 1, Column 5, please correct the formula to read:

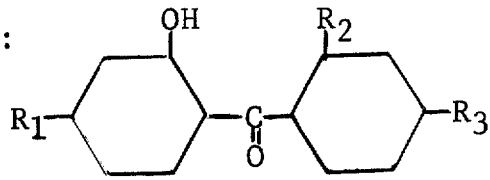

Signed and Sealed this second Day of September 1975

[SEAL]

Attest:

RUTH C. MASON
Attesting Officer

C. MARSHALL DANN
Commissioner of Patents and Trademarks